United States Patent [19]
Takano et al.

[11] Patent Number: 5,996,281
[45] Date of Patent: Dec. 7, 1999

[54] SAFETY AUXILIARY APPARATUS FOR AUTOMATIC DOOR ASSEMBLY

[75] Inventors: Hiroshi Takano; Masazumi Morishita; Hiroaki Nakamura, all of Otsu, Japan

[73] Assignee: Optex Co., Ltd., Shiga, Japan

[21] Appl. No.: 08/959,440

[22] Filed: Oct. 28, 1997

[30] Foreign Application Priority Data

Oct. 31, 1996 [JP] Japan .................................. 8-307050

[51] Int. Cl.⁶ .................................................. E05F 15/02
[52] U.S. Cl. .................................................. 49/26; 49/28
[58] Field of Search .................. 49/25, 26, 27, 49/28; 200/61.43

[56] References Cited

U.S. PATENT DOCUMENTS

| | | | |
|---|---|---|---|
| Re. 30,719 | 8/1981 | Mills | 49/25 X |
| 3,609,914 | 10/1971 | Berl | 49/25 X |
| 4,452,009 | 6/1984 | Baumeler et al. | 49/28 X |
| 4,621,452 | 11/1986 | Deeg | 49/28 X |
| 4,706,227 | 11/1987 | DuVall et al. | 49/25 X |
| 4,866,881 | 9/1989 | Morrow et al. | 49/28 X |
| 4,914,859 | 4/1990 | Gionet et al. | 49/26 X |
| 5,581,944 | 12/1996 | Kornbrekke et al. | 49/28 |

FOREIGN PATENT DOCUMENTS

| | | | |
|---|---|---|---|
| 684193 | 4/1964 | Canada | 49/25 |
| 6138253 | 5/1994 | Japan . | |

*Primary Examiner*—Jerry Redman
*Attorney, Agent, or Firm*—Sughrue, Mion, Zinn, Macpeak & Seas, PLLC

[57] ABSTRACT

A safety auxiliary apparatus for an automatic door assembly includes a single door or first and second doors slidable along a predetermined track for selectively opening and closing the doorway, first and second mutually confronting closure faces being defined by said first and second doors or said single door in cooperation with a brace. A casing accommodating therein a light emitting element for emitting a beam for detection of an object and a light receiving element for receiving the beam from the light emitting element is mounted in a longitudinal frame member of the doors or said brace that define respectively said closure faces, so that an optical path can be defined between said closure faces so as to extend from the light emitting element to the light receiving element.

12 Claims, 12 Drawing Sheets

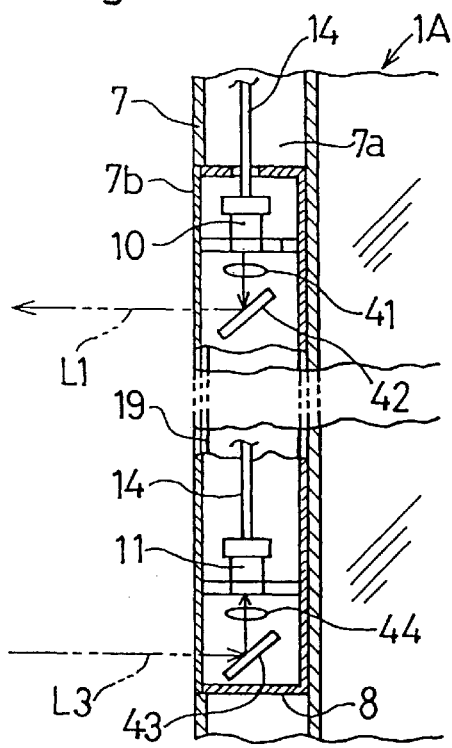
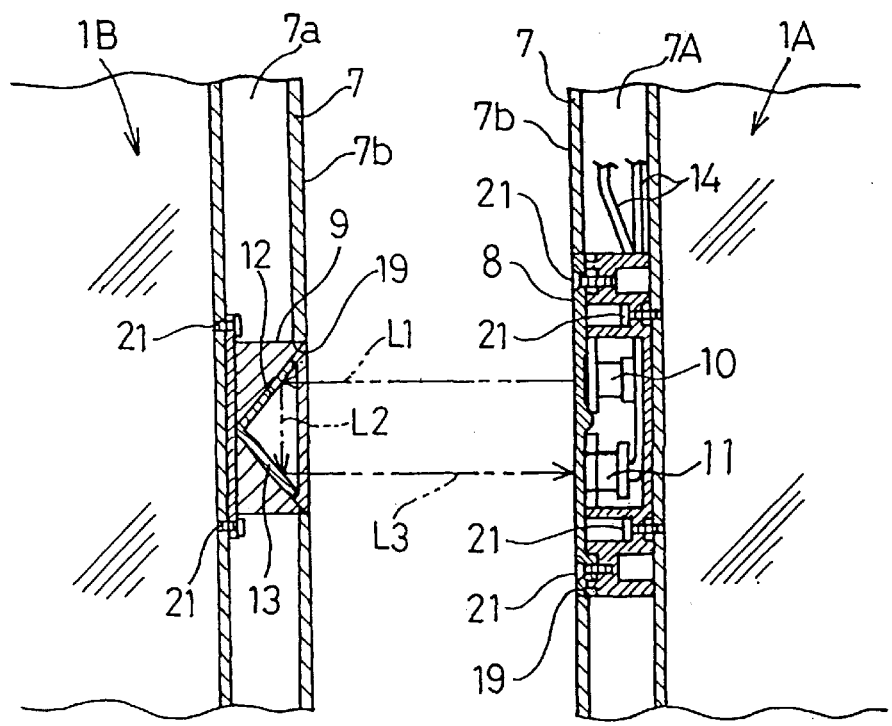

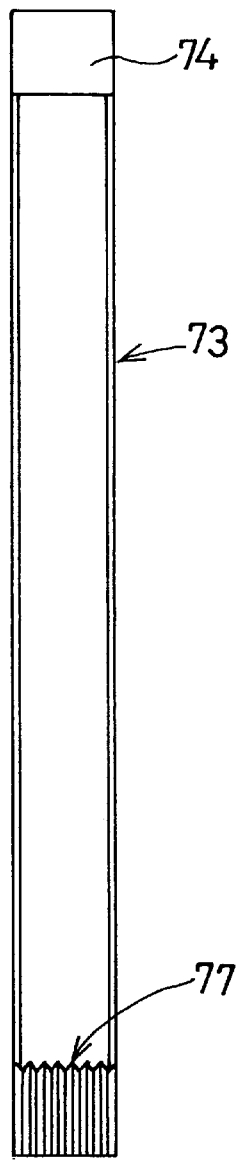
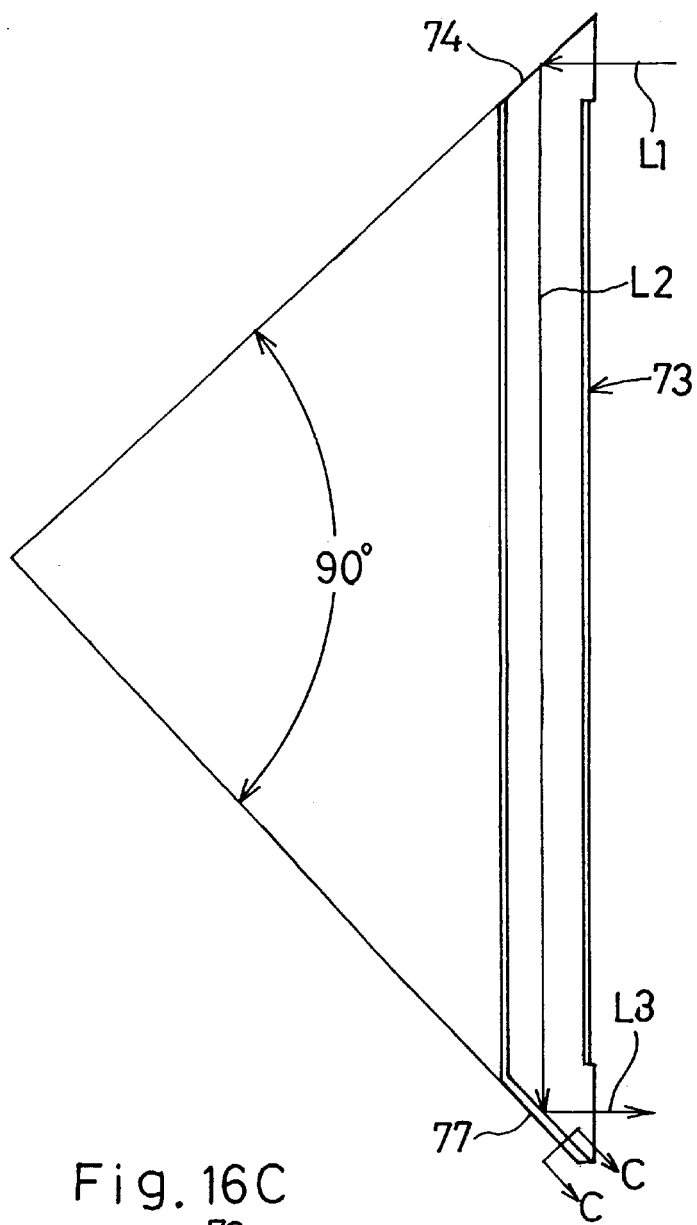
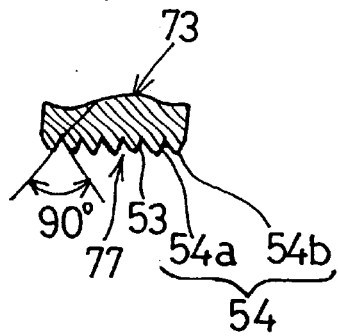
Fig.16A
Fig.16B
Fig.16C

SAFETY AUXILIARY APPARATUS FOR AUTOMATIC DOOR ASSEMBLY

BACKGROUND OF THE INVENTION

1. Field of the Invention

The present invention relates to a safety auxiliary apparatus for an automatic sliding door assembly for selectively opening and closing a doorway by detection of of an object such as a person within a predetermied search area and, more particularly, to the safety auxiliary apparatus operable to keep the door assembly in an opened position in the event that the object is present on a path of movement of the door assembly and out of the search area.

2. Description of the Prior Art

Where an automatic door assembly is installed at a doorway for movement along a predetermined track, a detecting area is generally defined on respective indoor and outdoor sides of the doorway with respect to the door assembly. A starter sensor for detecting the presence or absence of an object within the detecting area is generally in the form of a mat-type sensor or an ultrasonic or pyroelectric sensor having an output unit that is triggered on by the sensor, when the latter detects an approach of the object within the predetermined detecting area, so that the door assembly can be opened.

On the other hand, a safety auxiliary sensor generally utilizing a beam of light is installed at a location adjacent the predetermined track and between the indoor and outdoor detecting areas. This safety auxiliary sensor generally includes a light emitting element, mounted on one of opposed upright braces or columns defining the doorway, and a light receiving element mounted on the other of the upright braces so that a beam of light emitted from the light emitting element can travel towards the light receiving element across the doorway. The presence of the object above the predetennined track can be detected when the beam traversing from the light emitting element towards the light receiving element is intercepted, that is, when the light receiving element fails to receive the beam from the light emitting element. In the event that the safety auxiliary sensor detects the presence of the object above the predetermined track, the door assembly once moved to the opened position can be retained at the opened position even though the output unit is triggered off.

By way of example, in the event that the person attempting to cross the predetermined track in the doorway stops at the predetermined track, the starter sensor will be switched off because of the absence of the person within the indoor and outdoor detecting areas and, therefore, the safety auxiliary sensor is activated to keep the door assembly in the opened position until the person completely leaves from the predetermined track. By so doing, the possibility is substantially eliminated that the door assembly tending to move to the closed position may collide against the person standing on the predetermined track and/or a person's clothing may be caught between the door and the upright brace or between the doors.

However, according to the prior art, since the safety auxiliary sensor is generally mounted on the upright brace installed on an outdoor side with respect to the doorway, it may often occur that in a snowy country snow piles up on one or both of the light emitting and receiving elements forming respective parts of the safety auxiliary sensor and the door assembly is therefore kept opened. Accordingly, a compromise is that in the snowy country the safety auxiliary sensor is to be installed on the indoor side with respect to the doorway and, in such case, no upright brace is available for installation of the safety auxiliary sensor.

Therefore, when the safety auxiliary sensor is to be installed on the indoor side of the doorway, a stay dedicated to support the safety auxiliary sensor must be erected on the floor on the indoor side of the doorway, resulting in increase of the cost for installation. Moreover, the light receiving element of the safety auxiliary sensor mounted on the stay is exposed to the sight of passengers, resulting in deterioration of the appearance of the entrance to a house or building. In addition, a passenger may collide one or both of the light emitting and receiving elements causing failure of the sensor.

Furthermore, since the light emitting and receiving elements are mounted on the upright brace positioned on the outdoor side with respect to the door assembly so that an optical path between the light emitting and receiving elements can lie parallel to the direction of movement of the door assembly along the track, it is not possible to assuredly detect the presence of the object right on the track. For this reason, in the event that two persons stop above the track to talk, the door assembly may move towards the closed position.

In addition, considering that the safety auxiliary sensor is required to detect passage of a child or a small pet animal such as, for example, a puppy or a kitten across the track, the optical path along which the beam travels from the light emitting element towards the light receiving element is set at a relatively low height level, for example, about 60 cm, above the surface of the doorway. For this reason, if an aged person with bowed back walks slowly to trespass the track in the doorway, there is the possibility that although the upper half of his or her body stays on the track, the lower half of his or her body is unable to intercept the beam, resulting in the door assembly being moved towards the closed position. In order to assuredly avoid this possibility, a plurality of the safety auxiliary sensors must be employed and positioned one above the other, resulting in increase of the cost.

In the meantime, an obstruction detecting system for an automatic door assembly which comprises a light emitting device, a light receiving device and a plurality of reflectors disposed in the doorway formed by confronting end surfaces of the doors is disclosed in the Japanese laid-open Patent Publication No. 6-138253. If the obstruction detecting system referred to above were to be used as a safety auxiliary apparatus for an automatic door assembly, it appears that with the use of a single set of the light emitting and receiving devices a plurality of search lines can be set so as to extend parallel to the track for the door assembly and spaced one above the other in a vertical direction by allowing a beam from the light emitting device to reflect several times before it is received by the light receiving device. Accordingly, not only can an object present on the track for the door assembly be inexpensively detected with no fault, but also the system can be immune from adverse influences which would otherwise brought about by, for example, snow, since they can be installed in the doorway.

However, the Japanese publication referred to above merely discloses the principle in which if the light emitting and receiving devices and the plural reflectors are installed in the doorway, the plural paths along which the beam from the light emitting device travels towards the light receiving device in a generally zig-zag fashion can be obtained. Nothing is disclosed therein about means for installing the system in the automatic door assembly in a manner necessary to solve the previously discussed problems. More specifically, the Japanese publication referred to above is silent as to the position and manner in which the light emitting device is installed in the door assembly, an electric wiring system used for the light emitting and receiving devices, and alignment of optical axes of the light emitting device, light receiving device and reflectors.

Considering that when the door assembly is moved to the opened position, the doorway is open full width, even the slightest misalignment of the optical axes would result in the light receiving device failing to receive the incoming beam and also in reduction in amount of light received by the light receiving element, accompanied by a considerable reduction in detection sensitivity.

SUMMARY OF THE INVENTION

Accordingly, the present invention has for its object to provide an improved safety auxiliary apparatus for an automatic door assembly, in which alignment of component parts at the time of installation of the apparatus can easily be accomplished, an electric wiring can be accomplished without deteriorating the appearance of the entrance where the door assembly is installed, and the presence or absence of an object on the track for the door assembly can assuredly be detected.

To this end, the present invention in one aspect provides a safety auxiliary apparatus for an automatic door assembly including a single door or first and second doors slidable along a predetermined track for selectively opening and closing the doorway, first and second mutually confronting closure faces being defined by the first and second doors, or the single door and a brace. A casing accommodating therein a light emitting element for emitting a beam for detection of an object and/or a light receiving element for receiving the beam from the light emitting element is mounted in a longitudinal frame member of the door or the brace that define respectively the closure faces, so that an optical path can be defined between the closure faces so as to extend from the light emitting element to the light receiving element.

With the safety auxiliary apparatus of the structure according to the present invention, merely by installing the casing in a predetermined location of the closure face of the door or the brace, an optical path between the light emitting and receiving elements can be accurately determined. Accordingly, no complicated alignment job is necessary and a requisite search line can easily be set up.

Preferably, the closure face of the longitudinal frame member or the brace is formed with a mounting recess, the casing being accommodated within the mounting recess so that merely by inserting the casing in the mounting recess, the safety auxiliary apparatus can easily and quickly be installed with an alignment of optical axes accurately accomplished between the light emitting and receiving elements.

Moreover, since the mounting recess for accommodating the casing is defined in the closure face of one of the longitudinal frame member or the brace, a search line represented by a passage of light can be set up above the track so that the presence or absence of an object can assuredly be detected. Also, since the casing is embedded in the closure face of the longitudinal frame member or the brace, the appearance will not be deteriorated and no trouble will occur which would otherwise occur when something collides.

In a preferred embodiment of the present invention, the number of the doors is two and, hence, two casing are used. The first casing is mounted on the longitudinal frame member of one of the doors and accommodates the light emitting and receiving elements positioned one above the other. The second casing is mounted on the longitudinal frame member of the other of the doors and accommodates therein an optical reflecting element. The optical reflecting element includes first and second reflecting surfaces positioned one above the other. In this embodiment, the beam emitted by the light emitting element is, after having been reflected by the first reflecting surface, impinges upon the second reflecting surface and is again reflected by the second reflecting surface so as to travel towards the light receiving element.

According to such preferred embodiment of the present invention, alignment of the respective optical axes between the light emitting and receiving elements and that between the light emitting or receiving elements and the reflecting surface can be achieved with high accuracy and, also, two search lines positioned one above the other on the track can be set up. Accordingly, with the structure being low in cost, the object on the track can be assuredly detected by the two search lines on the track.

In another preferred embodiment of the present invention, the number of the door is one and, hence, the closure faces are defined by the longitudinal frame member of the door and the brace, respectively. In this case, the first casing is mounted on one of the longitudinal frame member and the brace and accommodates the light emitting and receiving elements positioned one above the other. The second casing is mounted on the other of the longitudinal frame member and the brace and accommodates therein an optical reflecting element. The optical reflecting element including first and second reflecting surfaces positioned one above the other so that the beam emitted by the light emitting element can, after having been reflected by the first reflecting surface, impinges upon the second reflecting surface and is again reflected by the second reflecting surface so as to travel towards the light receiving element.

According to such another embodiment of the present invention, the safety auxiliary apparatus can be applied to a single sliding door assembly. Even in the environment of the single sliding door assembly, alignment of the respective optical axes between the light emitting and receiving elements and that between the light emitting or receiving elements and the reflecting surface can be achieved with high accuracy and, also, two search lines positioned one above the other on the track can be set up.

According to a further preferred embodiment of the present invention, respective electric lines leading from the light emitting and receiving elements are drawn upwardly through an interior of the longitudinal frame member or the brace. This design permits the wiring to be accomplished with no need to use support or guide member therefor which wiring is drawn from the to light emitting and receiving elements installed in the longitudinal frame member or the brace. Accordingly, the appearance will not be deteriorated which would otherwise result from the presence of the wiring. Moreover, the wiring can be protected without being exposed to the outside.

The present invention in another aspect provides the safety auxiliary apparatus which includes first and second doors slidable along a predetermined track for selectively opening and closing a doorway, which first and second doors have respective first and second closure faces confronting with each other. A light emitting element for emitting a beam for detection of an object and a light receiving element for receiving the beam from the light emitting element are mounted in the first door one above the other. An optical reflecting element is mounted in the second door and includes first and second reflecting surfaces positioned one above the other and confronting outwardly from the first closure face of the door. In this arrangement, the beam emitted by the light emitting element can, after having been reflected by the first reflecting surface, impinges upon the second reflecting surface and is again reflected by the second reflecting surface so as to travel towards the light receiving element. One of the first and second reflecting surfaces of the optical reflecting element includes at least one pair of reflecting facets laid right angles relative to each other with respect to a dale line.

According to this aspect of the present invention, the safety auxiliary apparatus is featured in that one of the first and second reflecting surfaces includes at least one pair of the reflecting facets laid right angles relative to each other with respect to the dale line. Accordingly, even if the incident beam from the light emitting element is displaced in position relative to the optical reflecting element with respect to any one of horizontal and vertical planes, the beam reflected by the optical reflecting element can be returned so as to travel in the same direction as the incident beam. For this reason, no accurate positioning of both of the light emitting and receiving element relative to the optical reflecting element is needed, and the object can assuredly be detected even when the door is slightly tilted during its selective opening or closing. Also, if the number of the pairs of the reflecting facets is increased, the loss of light can be reduced. In addition, the two search line can also be set up spaced one above the other above the track.

According to a further aspect of the present invention, the safely auxiliary apparatus includes a single door slidable along a predetermined track for selectively opening and closing a doorway and having a first closure face confronting the doorway, and a stationary brace having a second closure face confronting the doorway. A light emitting element for emitting a beam for detection of an object and a light receiving element for receiving the beam from the light emitting element are mounted in one of the stationary brace and the door, and an optical reflecting element mounted in the other of the stationary brace and the door and including first and second reflecting surfaces is positioned one above the other and confronting outwardly from the closure face of said one of the stationary brace and the door. Even in this apparatus, the beam emitted by the light emitting element impinges, after having been reflected bat the first reflecting surface, upon the second reflecting surface and is again reflected by the second reflecting surface so as to travel towards the light receiving element. One of the first and second reflecting surfaces of the optical reflecting element includes at least one pair of reflecting facets laid right angles relative to each other with respect to a dale line.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 7 is a fragmentary longitudinal sectional view of a portion of one of the doors, showing the safety auxiliary apparatus according to a second preferred embodiment of the present invention;

FIG. 8 is a fragmentary longitudinal sectional view of respective portions of the doors, showing the safety auxiliary apparatus according to a third preferred embodiment of the present invention;

FIGS. 16A to 16C are front elevational, side and transverse sectional views taken along the line C—C, respectively, of an optical reflecting element employed in the safety auxiliary apparatus according to a seventh preferred embodiment of the present invention;

DETAILED DESCRIPTION OF THE EMBODIMENTS

With reference to the accompanying drawings, several preferred embodiments of the present invention will be described in detail.

First Preferred Embodiment

Figure 1A:
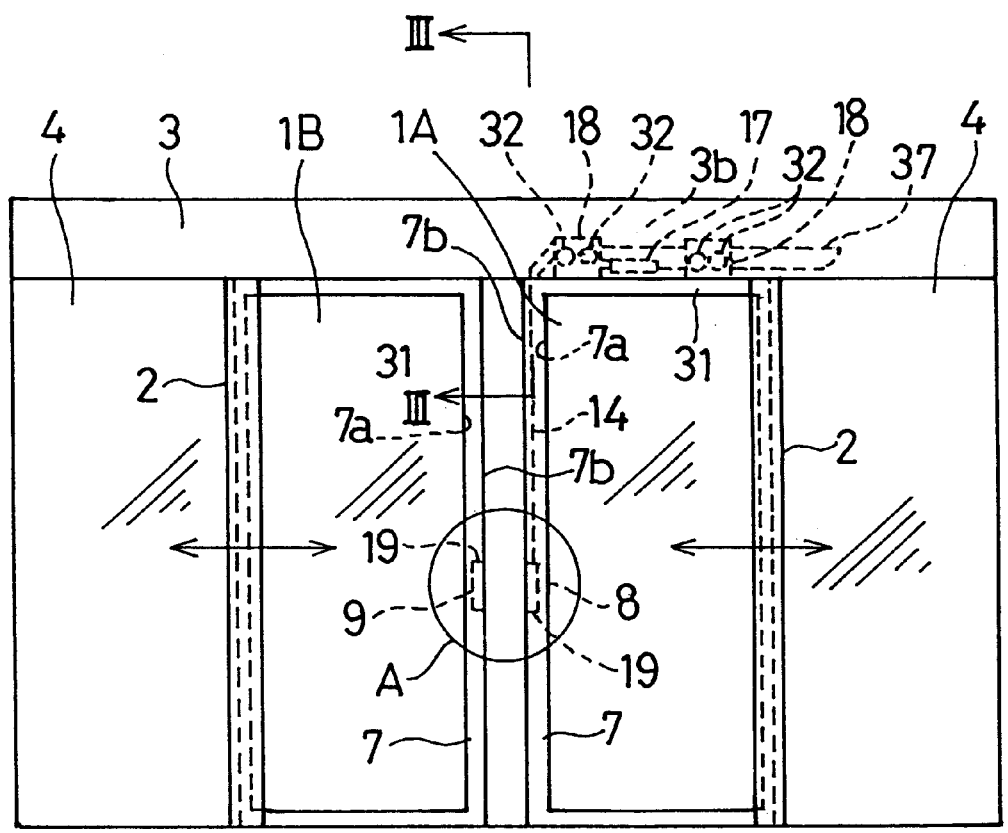
FIG. 1A is a front elevational representation, showing the layout of an entrance of a building where a safety auxiliary apparatus embodying the present invention can be installed.
Figure 1B:
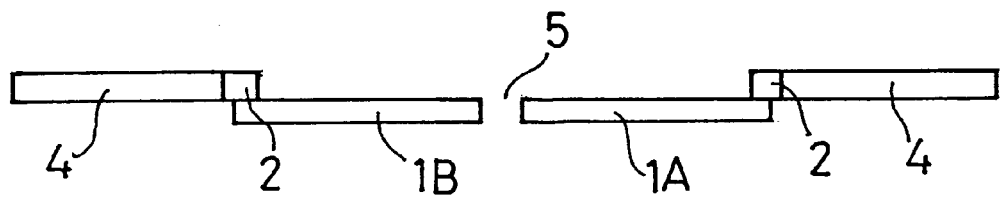
FIG. 1B is a schematic top plan view of the door assembly shown in FIG. 1A.

Referring to FIG. 1A, there is shown, in a front elevational representation, the layout of an entrance of, for example, a building where a safety auxiliary apparatus embodying the present invention can be installed. The illustrated entrance includes a very popular double sliding door assembly. As best shown in FIG. 1B, the double sliding door assembly includes right and left oblong glass doors 1A and 1B slidable along upper and lower guide rails in unison with each other between closed and opened positions so that a doorway 5 connecting between indoor and outdoor spaces can be selectively opened and closed.

With the right and left glass doors 1A and 1B held in the closed position, right and left upright braces 2 are fixedly positioned adjacent and in overlapping relation to respective right and left side edges of the right and left glass doors 1A and 1B. As is well know to those skilled in the art, the upright braces 2 form parts of a wall support structure for supporting front wall segments, for example, right and left glass panes 4 in the illustrated embodiment. The up-right braces 2 together with the glass panes 4 are installed on one side of the double sliding door assembly adjacent the outdoor space with the glass panes 4 lying parallel to the glass doors 1A and 1B so that the glass door 1A and 1B can, during their selective opening or closure, move along the right and left glass panes 4, respectively.

A transom 3 extends horizontally above the glass door assembly and the glass panes 4 and has an engine room defined therein for accommodating an automatic door control mechanism for automatically opening and closing the glass doors 1A and 1B in unison with each other.

Although not shown, the transom 3 has an interior in which a drive pulley drivingly coupled with a drive motor, a driven pulley and a drive transmission belt drivingly trained between the drive and driven pulleys are disposed. The drive transmission belt may be a toothed belt and is coupled with the glass doors 1A and 1B by means of respective brackets each connected at one end with an intermediate portion of a top end of the associated glass door 1A or 1B and at the opposite end with a corresponding portion of the drive transmission belt. Accordingly, when the drive transmission belt is driven, the glass doors 1A and 1B can be moved along a predetermined track.

In the illustrated embodiment, each of the oblong glass doors 1A and 1B is exteriorly trimmed by an oblong right or left metal frame made of, for example, aluminum or stainless steel. This metal frame is made up of top and bottom frame segments and two upright frame segments assembled together to render it to represent a rectangular shape similar to the associated glass door 1A or 1B. The upright frame segments of the right and left metal frames which cover left and right side edges of the associated glass doors 1A and 1B are identified generally by 7.

The upright frame segments 7 of the right and left metal frames on the right and left glass doors 1A and 1B have closure faces 7b confronting with each other and adapted to be brought into engagement with each other when the glass doors 1A and 1B are moved to and held in the closed position, thereby closing the doorway 5. A portion of the closure face 7b of the upright frame segment 7 on the right glass door 1A has a generally rectangular box-like first casing 8 disposed inside the corresponding upright frame segment 7 and, similarly, a portion of the closure face 7b of the upright frame segment 7 on the left glass door 1B has a generally rectangular box-like second casing 9 disposed inside the corresponding upright frame segment 7.

Figure 2:
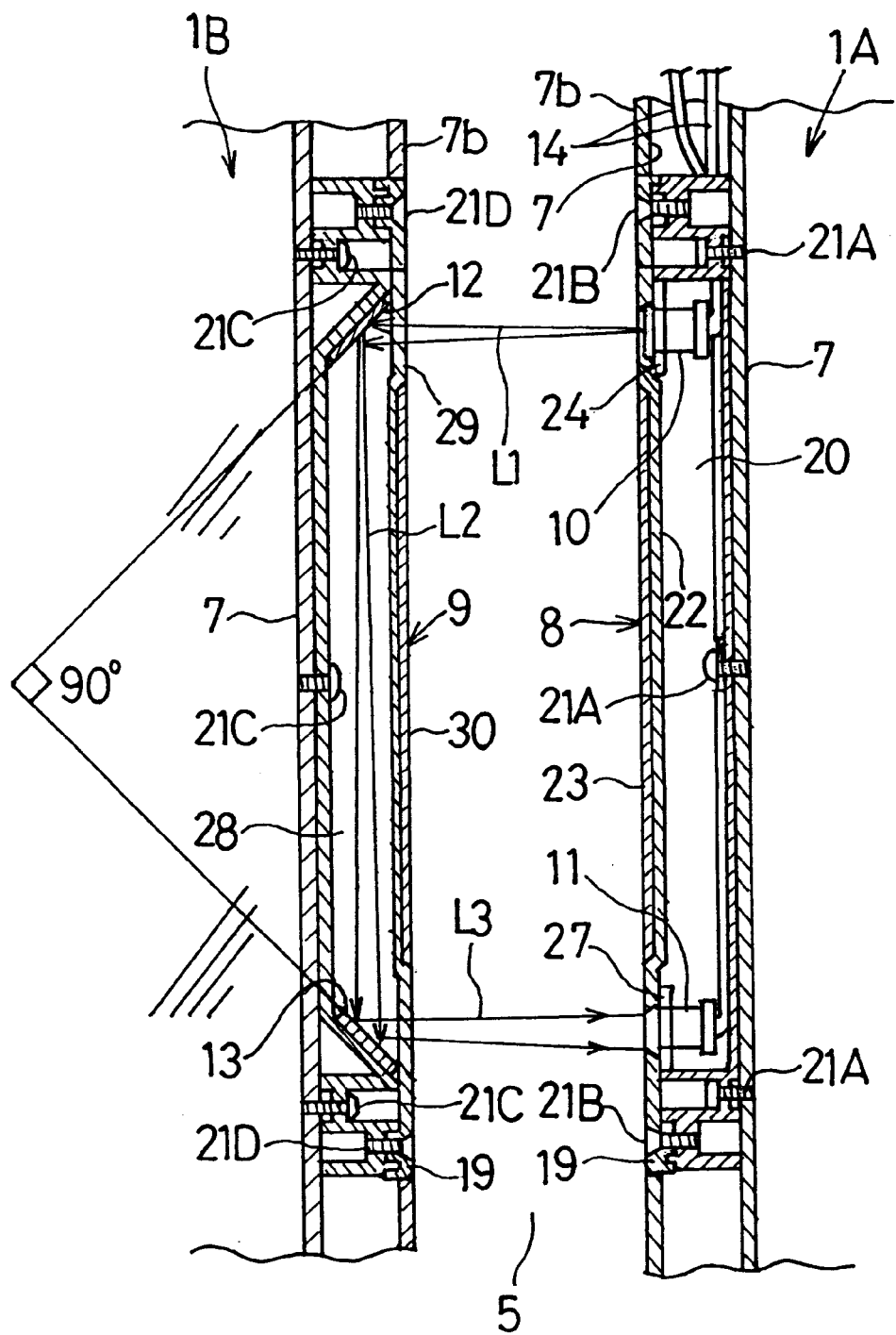
FIG. 2 is a fragmentary longitudinal sectional view, on an enlarged scale, of the door assembly showing the details of the portion encompassed by a circle A in FIG. 1.

As best shown in FIG. 2 which illustrate a sectional view, on an enlarged scale, of a portion of the door assembly that is enclosed by a circle A in FIG. 1A, a light emitting element 10 and a light receiving element 11 are accommodated and disposed one above the other within the first casing 8 and first and second optical reflecting elements, for example, first and second reflecting mirrors 12 and 13, are accommodated and disposed one above the other within the second casing 9.

A bundle of electric lines 14 extending respectively from the light emitting and receiving elements 10 and 11 are drawn out of the first casing 8 into an interior 7a of the upright frame segment 7. The bundle of the electric line 14 then extend upwardly through the interior 7a of the upright frame segment 7 into the transom 3. As shown in FIG. 1A, the bundle of the electric lines 14 extending into the transom 3 are supported by one of two hanger members 18 remote from the right glass pane 4 and are connected with an amplifier 17 fixed within the transom 3 as will be described in detail later.

Referring particularly to FIG. 2, a portion of the closure face 7b of the upright frame segment 7 on each of the right and left glass doors 1A and 1B is bored to define a mounting recess 19 within the respective upright frame segment 7. The first or second casing 8 or 9 is fixedly housed within the mounting recess 19 in each of the upright frame segments 7. The first casing 8 comprises a generally cup-shaped body 20 having an opening and is, after having been inserted into the mounting recess 19 with its opening aligned with the bore in that portion of the closure face 7b, secured to a rear wall of the upright frame segment 7 by means of a plurality of set screws 21A. A carrier board 22 on which the light emitting and receiving elements 10 and 11 have been mounted is secured to the first casing body 20 by means of upper and lower set screws 21B to close the opening of the first casing body 20. Thereafter, a decorative plate 23 is fitted into a mounting groove defined in the carrier board 22 between the light emitting and receiving elements 10 and 11. In this way, the first casing 8 is mounted in the mounting recess 19 in the upright frame segment 7.

The light emitting element 10 referred to above may be an infrared light emitting diode and is used in combination with a light projecting lens (not shown). On the other hand, the light receiving element 11 may be a photo-diode and is used in combination with a light collecting lens (not shown). The light emitting and receiving elements 10 and 11 are so positioned within the first casing 8 that a beam of light emitted from the light emitting element 8 and a beam of light incident on the light receiving element 9 can travel in respective directions exactly perpendicular to the longitudinal sense of the first casing 8. To facilitate mounting of the light emitting and receiving elements 10 and 11 in the manner described above, the light emitting and receiving elements 10 and 11 are firmly supported having been received within respective mounting holes defined in support plates 24 and 27 which are formed integrally with the carrier board 22.

On the other hand, the second casing 9 comprises a generally cup-shaped body 28 having an opening and also having the first and second reflecting mirrors 12 and 13, and is, after having been inserted into the mounting recess 19 with its opening aligned with the bore in that portion of the closure face 7b, secured to a rear wall of the upright frame segment 7 by means of a plurality of set screws 21C. An oblong lid 29 is secured to the second casing body 28 by means of upper and lower set screws 21D so as to close the opening of the second casing body 28. A decorative plate 30 is thereafter is fitted into a mounting groove defined in a substantially center area of the oblong lid 29.

The first and second optical reflecting elements, that is, the first and second reflecting mirrors 12 and 13, each having a reflecting surface, are bonded to the second casing body 28 and positioned within the second casing body 29 by the use of any suitable bonding material. The first and second reflecting mirrors 12 and 13 are spaced a distance substantially equal to the distance between the light emitting and receiving elements 10 and 11 and are tilted 45° relative to the longitudinal axis of the upright frame segment 7 so as to permit the respective reflecting surfaces of the first and second reflecting mirrors 12 and 13 to lie at right angles relative to each other.

While the optical reflecting elements are employed in the form of the reflecting mirrors 12 and 13, vapor-deposited aluminum foils may be employed for the first and second optical reflecting elements in place of the reflecting mirrors. In such case, the first and second aluminum foils should be deposited on respective requisite portions of the second casing body 28. Alternatively, a prism having a pair of reflecting surfaces may be equally employed for the optical reflecting element. The use of the prism for the optical reflecting element is particularly advantageous in that a total reflection of the incoming light is possible without the light being attenuated resulting in a sufficient amount of light maintained in the safety auxiliary apparatus.

The light emitting and receiving elements 10 and 11 are positioned one above the other and are disposed symmetrically with respect to a point intermediate of the length of the first casing 8. Similarly, the first and second reflecting mirrors 12 and 13 are positioned one above the other and are disposed symmetrically with respect to the point intermediate of the length of the second casing 9. For this purpose, the mounting recesses 19 defined in the left and right upright frame segments 7 for encasing the first and second casings 8 and 9, respectively, are located at the same heightwise level.

Accordingly, by installing the first and second casings 8 and 9 in the respective mounting recesses 19, the light emitting and receiving elements 10 and 11 and first and second reflecting mirrors 12 and 13 can be accurately positioned relative to each other without the need of a complicated alignment job so that light emitted from the light emitting element 10 can travel towards the first reflecting mirror 12 along a first path L1, then towards the second reflecting mirror 13 along a second path L2 after having been reflected by the first reflecting mirror 12 and finally towards the light receiving element 11 along the third path L3 after having been reflected by the second reflecting mirror 13.

It is to be noted that each of the first and second casings 8 and 9 has a width (as measured in a direction transverse to the upright frame segments 7) which is chosen to be slightly smaller than the distance of spacing of mutually confronting faces of the associated upright frame segment 7. Accordingly, with the first and second casings 8 and 9 encased within the respective mounting recesses 19, respective front faces of the first and second casings 8 and 9 are held in flush with the associated closure faces 7b of the upright frame segments 7.

The bundle of the electric lines 14 extending from the light emitting and receiving elements 10 and 11 and drawn out of the first casing 8 are, after having been led into an inner space 3b of the transom 3 through the interior 7a of the upright frame segment 7, connected with the amplifier 17 fixedly accommodated within the inner space 3b of the transom 3, as briefly discussed with reference to FIG. 1A. This wiring will now be described in detail with particular reference to FIGS. 3A and 3B.

Figure 3A:
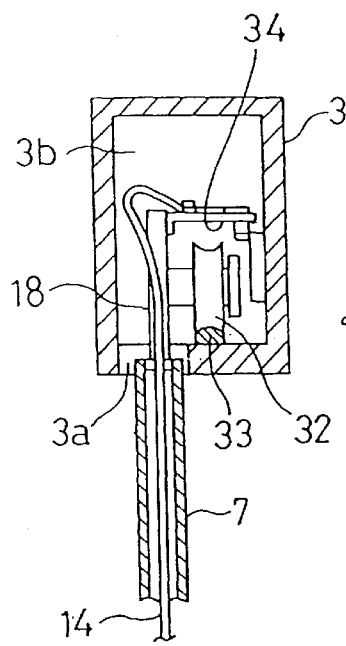
FIG. 3A is a schematic transverse sectional view of a transom taken along the line III—III in FIG. 1, showing the manner in which the door assembly is slidably supported and also showing electric lines drawn from light emitting and receiving elements so as to extend into the transom.
Figure 3B:
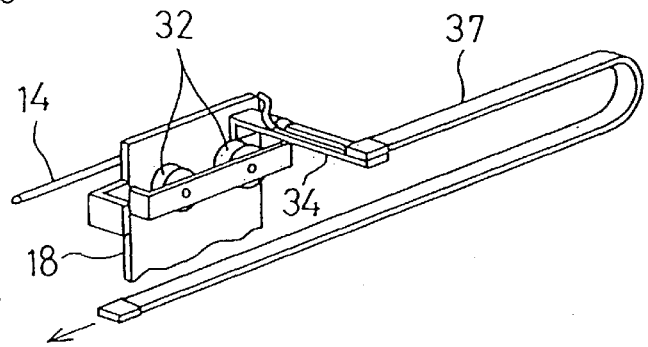
FIG. 3B is a fragmentary perspective view, on an enlarged scale, showing one of hanger members secured to the door assembly.

FIG. 3A illustrates a cross-sectional representation of the transom 3 taken along the line III—III in FIG. 1A and FIG. 3B illustrates, in a perspective representation, the hanger members 18 fixedly mounted atop the right and left glass doors 1A and 1B, although the hanger members 18 on the left glass doors 1B are now shown. A pair of the hanger members 18 are disposed along a direction of the door movement and rigid with the upper end of the associated glass door 1A or 1B. Each hanger member 18 extends from the upper end of the associated glass door 1A or 1B into the inner space 3b of the transom 3 through a longitudinal bottom slit 3a defined in the transom 3 so as to extend longitudinally thereof, as clearly shown in FIG. 3A. Each of the hanger members 18 has, as shown in FIG. 3B, two spaced rollers 32 rotatably mounted thereon. Accordingly, the rollers 32 on each hanger member 18 are positioned within the inner space 3a of the transom 3 and rollingly rest on an upper guide rail 33 fast or integral with the transom 3 and extending within the transom 3 in a direction longitudinally thereof.

Thus, it will readily be understood that while respective lower ends of the right and left glass doors 1A and 1B are slidingly engaged with the lower guide rail, the right and left glass doors 1A and 1B are movably suspended from the transom 3 with the guide rollers 32 on the hanger members 18 resting on the upper guide rail 33 to roll along the guide rail 33.

One of the hanger members 18 on the right glass door 1A which is positioned remote from the right glass pane 4 and adjacent the left glass door 1B is provided with a generally elongated retainer 34 connected at one end to an upper portion of the hanger member 18 in a cantilever fashion so as to extend laterally outwardly therefrom over the rollers 32. The bundle of the electric lines 14 introduced into the inner space 3b of the transom 3 are supported by the retainer 34.

As best shown in FIG. 3B, the bundle of the electric lines 14 are electrically connected with a flexible flat cable 37 at a position above a free end of the retainer 34. The flexible flat cable 37 so connected with the electric lines 14 extends a distance forwards (i.e., leftwards as viewed in FIG. 1A and is then turned backwardly before it is electrically connected with the amplifier 17. Accordingly, when the right glass door 1A moves, a U-turned portion of the flexible flat cable 37 secured to the hanger member 18 through the retainer 34 correspondingly moves to follow the movement of the right glass door 1B to thereby prevent the flexible flat cable 37 from being broken as a result of an excessive stress which would otherwise be set up in the flexible flat cable 37.

As hereinabove described, the electric lines 14 extending from the light emitting and receiving elements 10 and 11 extends within the interior 7a of the frame segment 7a and then within the inner space 3b of the transom 3. Therefore, the electric lines 14 are protected without being exposed to the outside and do not therefore constitute an eyesore. Moreover, the electric lines 14 are connected with the amplifier 17 through the flexible flat cable 37 by means of the retainer 34 which is secured to the existing hanger member 18, resulting in low cost configuration. Also, since the electric lines 14 are supported through the retainer 34 by the hanger member 18 movable together with the right glass door 1A, no twisting of the electric lines 14 will occur.

Figure 4:
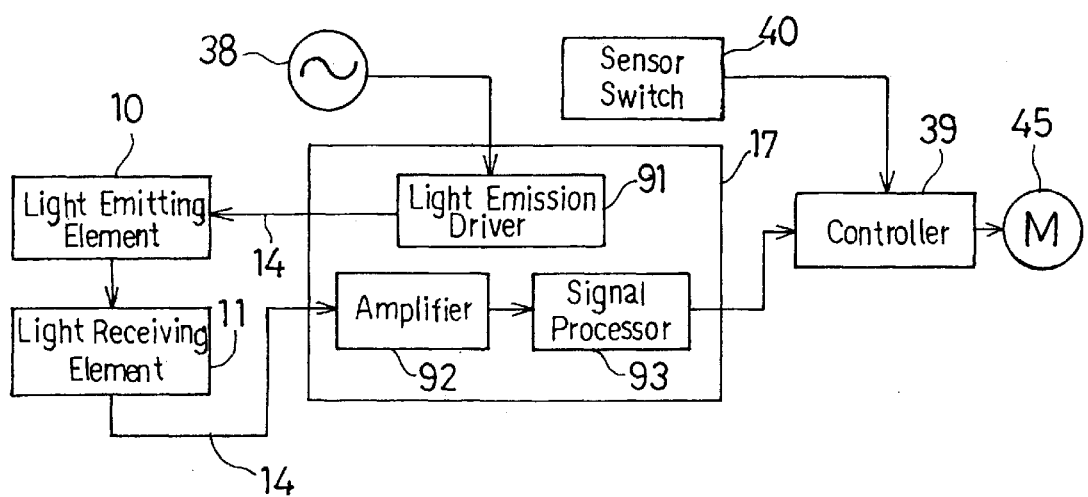
FIG. 4 is a block circuit diagram showing an electric circuit employed in the practice of the present invention.

FIG. 4 illustrates a block circuit diagram of an electric control system for the automatic door assembly embodying the present invention. As shown therein, the amplifier 17 is encased within an electric box together with a light emission driver 91, an amplifier 92 and a signal processor 93. The light emission driver 91 is electrically powered by an electric power source 38 and supplies an electric power to the light emitting element 10. Specifically, the light emission driver 91 applies a pulsating voltage to the light emitting element 10 to cause the latter to emit a pulse-modulated light.

On the other hand, the signal processor 93 is operable to process an electric signal from the light receiving element 11 via the amplifier 92 and then to output to a controller 39 an object signal indicative of an object sensed by the light receiving element 11 as will be described later. In other words, the signal processor 93 outputs the object signal when the light receiving element 11 fail to receive light because of the incoming light having been intercepted by the presence of an object.

The controller 39 when receiving the object signal outputted from the signal processor 93 controls a door drive motor 45 to keep the right and left glass doors 1A and 1B in the opened position regardless of whether or not an output signal is inputted to the controller 39 from a sensor switch 40. The sensor switch 40 is of a design capable of detecting the presence or absence of an object within a predetermined detecting area defined in the proximity of the door assembly, that is, the right and left glass doors 1A and 1B, and of generating to the controller 39 an output signal only when the presence of the object within the predetermined detecting area is detected.

With the safety auxiliary apparatus of the structure described hereinabove, merely by inserting the first and second casings 8 and 9 shown in FIG. 2 into the respective mounting recesses 19 in the left and right upright frame segments 7 confronting with each other, the light emitting and receiving elements 10 and 11 and first and second reflecting mirrors 12 and 13 can be accurately and precisely positioned relative to each other without the need of a complicated alignment job. For this reason, the present invention eliminates the necessity of a complicated and time-consuming aligning job in which attendant workers in charge of installation of the right and left glass doors 1A and 1B, respectively, have to communicate with each other to avoid any possible misalignment. Also, despite the fact that an inexpensive assembly of the light emitting and receiving elements 10 and 11 is employed, two search lines spaced one above the other can be defined in the doorway 5 or on the track of the doors 1A and 1B to assure that the presence of an object in the doorway 5 can be detected with no failure.

Moreover, since the first and second casings 8 and 9 are embedded inwardly of the mutually confronting closure faces 7b of the upright frame segments 7 of the respective metal frames on the right and left glass doors 1A and 1B, they would neither constitute an eyesore nor would be damaged in the event of collision with any object.

Figure 5:
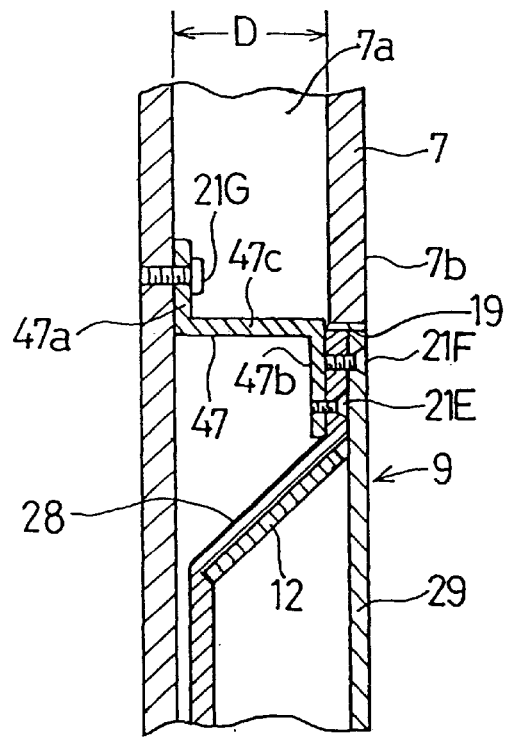
FIGS. 5 and 6 are fragmentary longitudinal sectional view, on an enlarged scale, showing different modifications of the first embodiment of the present invention.
Figure 6:
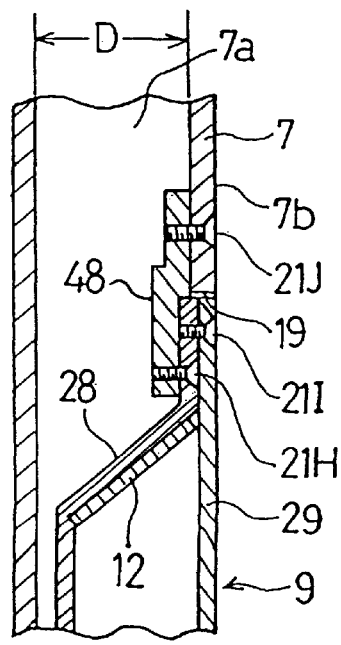

FIGS. 5 and 6 illustrate, in a fragmentary enlarged sectional view, respective modified forms of the safety auxiliary apparatus according to the present invention which are different from the foregoing embodiment with respect to the manner in which the first and second casings 8 and 9 are fitted to the upright frame segments 7.

In the modification shown in FIG. 5, a generally elongated fixture base 47 including a transverse body 47c and arms 47a and 47b lying perpendicular to the transverse body 47c and extending from opposite ends of the transverse body 47c in respective directions opposite to each other is accommodated within the interior 7a of the upright frame segment 7 with the arm 47a secured to a rear wall of the upright frame segment 7 by means of at least one set screw 21G. The fixture base 47 so secured to the rear wall of the upright frame segment 7 is positioned within the interior 7a of the upright frame segment 7 of the metal frame on the left glass door 1B, with the arm 47b exposed to the outside through the opening of the mounting recess 19. The second casing body 28 of the second casing 9 is, after having been inserted into the mounting recess 19, secured to the arm 47b by means of at least one set screws 21E and is covered by the decorative lid 29 that is secured to the arm 47b of the fixture base 47 by means of at least one set screw 21F threaded into the arm 47b through the second casing body 28.

Although not shown, the first casing 8 is fitted to a fixture base accommodated within the mounting recess 19 in the upright frame segment 7 of the metal frame on the right glass door 1A in a manner similar to that described above in connection with the second casing 9.

The modification shown in FIG. 5 is particularly advantageous in that even though the front and rear walls of the upright frame segment 7 are spaced a varying distance D, the first or second casing 8 or 9 can be accommodated within the mounting recess 19 with the associated decorative lid 29 held in flush with the closure face 7b if the fixture base 47 having the transverse body 47c of a size corresponding to the distance D is employed.

According to the modification shown in FIG. 6, a generally elongated fixture plate 48 is positioned within the interior 7a of the upright frame segment 7 and secured to the front wall of such upright frame segment 7 by means of a set screw 21J with a portion thereof exposed to the outside through the mounting recess 19. Thereafter, the second casing body 28 of the second casing 9 is, after having been inserted into the mounting recess 19, secured to the portion of the fixture plate 48 by means of a set screw 21H and is covered by the decorative lid 29 that is secured to the fixture plate 48 by means of a set screw 21I threaded into the portion of the fixture plate 48 through the second casing body 28.

Even in this modification shown in FIG. 6, although not shown, the first casing 8 is fitted to a fixture plate secured to the upright frame segment 7 of the metal frame on the right glass door 1A in a manner similar to that described above in connection with the second casing 9.

As is the case with the modification shown in FIG. 5, even the modification shown in FIG. 6 is advantageous in that even though the front and rear walls of the upright frame segment 7 are spaced a varying distance D, the fixture plate 48 of the same design can be employed regardless of change in the distance D so that the first or second casing 8 or 9 can be accommodated within the mounting recess 19 with the associated decorative lid 29 held in flush with the closure face 7b. However, even in this case, it is necessary that each of the first and second casings 8 and 9 should be tailored so as to have a width sufficient to allow the respective casing 8 or 9 to be inserted into the mounting recess 19 in the upright frame segment 7 of a type having the minimum possible width as defined between internal surfaces of opposite walls of the upright frame segment 7.

Second Preferred Embodiment

FIG. 7 illustrates a fragmentary longitudinal sectional view of that portion of the upright frame segment 7 according to the second preferred embodiment of the present invention. In this second embodiment, the light emitting and receiving elements 10 and 11 are accommodated within the first casing 8 with their light emitting and receiving windows oriented downwardly along the longitudinal axis of the upright frame segment 7. In this arrangement, the beam L1 of light emitted from the light emitting element 10 travels downwardly within the first casing 8 through the beam projecting lens 41 and is then deflected by a first auxiliary reflecting mirror 42, positioned within the first casing 8. On the other hand, the beam L3 of light emerging outwardly from the second casing 9 is received by the light receiving element 11 through the beam collecting lens 44 after having been reflected by a second auxiliary reflecting mirror 43, also positioned within the first casing 8, so as to travel upwardly within the first casing 8 towards the beam collecting lens 44.

The embodiment of the present invention shown in and described with reference to FIG. 7 does not only bring about advantages similar to those brought about by the foregoing embodiment, but also brings about an additional advantage in that the electric lines 14 leading from the light emitting and receiving elements 10 and 11 need not be bent within the first casing 8 and can be drawn straight out of the first casing 8. Accordingly, as compared with the case in which the electric lines 14 are bent before they are drawn out of the first casing 8 as shown in FIG. 2, not only can the first casing 8 employed in the second embodiment of the present invention have a relatively small depth and can, therefore, be employed in the upright frame segment 7 of a type having an undersized interior 7a, but also the possibility of the electric lines 14 being broken due to a sharp bent within the first casing 8 can advantageously be minimized.

It is to be noted that in the practice of the second embodiment of the present invention, one or both of a combination of the beam projecting lens 41 with the first auxiliary reflecting mirror 42 and a combination of the beam collecting lens 44 with the second auxiliary reflecting mirror 43 may be replaced with a total reflection prism of a kind having a concave lens portion. Also, although in FIG. 7 the light emitting and receiving elements 10 and 11 have been shown and described as oriented downwardly within the first casing 8 along the longitudinal axis of the upright frame segment 7, one of the light emitting and receiving elements 10 and 11 may be disposed in a manner similar to that shown and described in connection with the first embodiment and the other of the light emitting and receiving elements 10 and 11 may be disposed in a manner shown and described in connection with the second embodiment.

Third Preferred Embodiment

The safety auxiliary apparatus according to a third preferred embodiment of the present invention is shown in FIG. 8 in a fragmentary longitudinal sectional representation. In this illustrated embodiment, the second casing 9 accommodates therein a single mirror carrier carrying the first and second reflecting mirrors 12 and 13 so integrated and so positioned as to lie at right angles to each other. On the other hand, the light emitting and receiving elements 10 and 11 within the first casing 8 are positioned having been oriented towards the first and second reflecting mirrors 12 and 13, respectively.

Even in this third embodiment of the present invention, mere mounting of the first and second casings 8 and 9 into the mounting recesses 19 in the upright frame segments 7 of the metal frames on the right and left glass doors 1A and 1B, respectively, is sufficient to establish an intended optical circuit between the light emitting and receiving elements 10 and 11 by way of the reflecting mirrors 12 and 13 without the need of a complicated alignment job. Also, the electric lines 14 leading from the light emitting and receiving elements 10 and 11 and to be connected with the amplifier 17 can extend through the interior 7a of the upright frame segment 7 of the metal frame on only the right glass door 1A and the search lines can be defined on the track of the doors 1A and 1B. Furthermore, an additional advantage can be appreciated that even though respective optical axes of the reflecting mirrors 12 and 13 are misaligned to a certain extent, the amount of the light received by the light receiving element 11 will not be adversely affected and the alignment of the optical axes can easily be accomplished. It is, however, to be noted that since the search lines in the embodiment shown in FIG. 8 are spaced a slight distance from each other, the system of FIG. 8 may be considered having a single search line.

Fourth Preferred Embodiment

Figure 9:
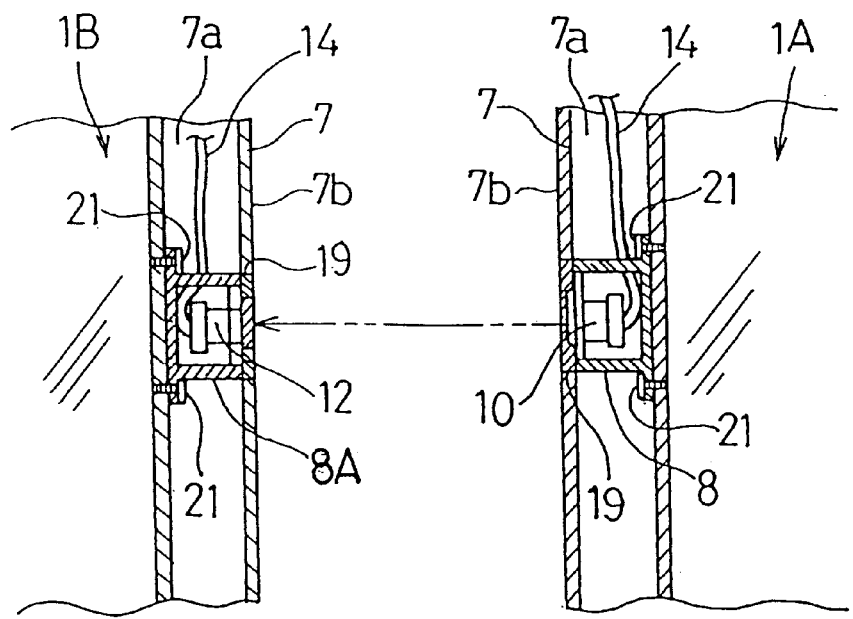
FIG. 9 is a view similar to FIG. 8, showing a fourth preferred embodiment of the present invention.

The safety auxiliary apparatus according to a fourth preferred embodiment of the present invention is shown in FIG. 9 in a fragmentary longitudinal sectional representation. In this illustrated embodiment, no reflecting mirror is employed and, instead, the light emitting and receiving elements 10 and 11 are separated and housed within the first and second casings 8 and 8A, respectively. This embodiment necessitates the electric lines 14 from the light emitting and receiving elements 10 and 11 to extend within the interiors 7a of the upright frame segments 7 of the metal frames on the right and left glass doors 1A and 1B, respectively, before they are connected with the amplifier 17.

Although in this embodiment only one search line represented by a beam travelling from the light emitting element 10 directly towards the light receiving element 11 is available, mere mounting of the first and second casings 8 and 8A into the mounting recesses 19 in the upright frame segments 7 of the metal frames on the right and left glass doors 1A and 1B, respectively, is sufficient to establish an intended optical circuit between the light emitting and receiving elements 10 and 11 to secure the search line in the doorway 5 without the need of a complicated alignment job as is the case with any one of the foregoing embodiments. However, if in this embodiment a plurality of the safety auxiliary apparatuses are employed and positioned one above the other, a corresponding number of the search lines can be obtained so that detection of an object present on the track can be accomplished assuredly.

Fifth Preferred Embodiment

Figure 10:
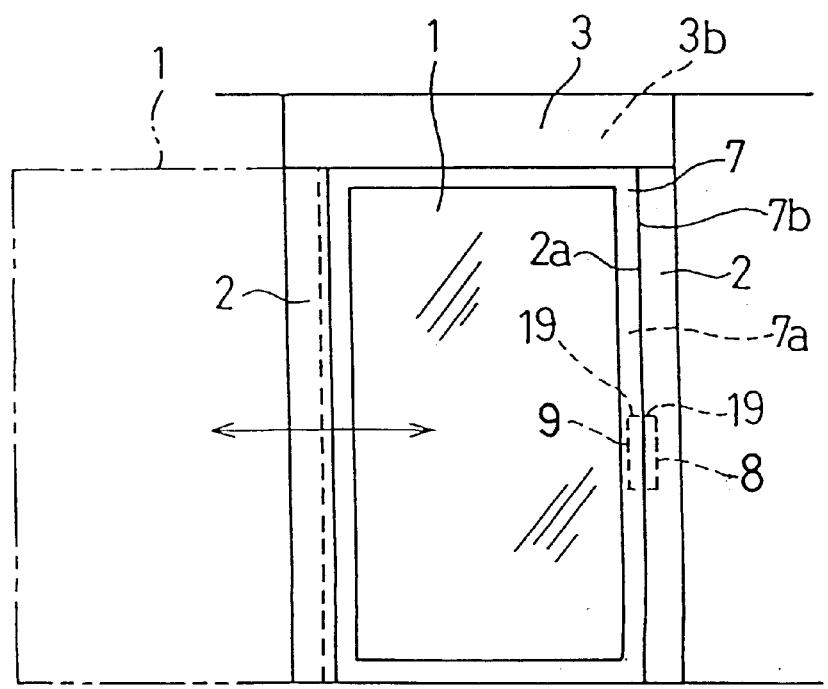
FIG. 10 is a view similar to FIG. 1A, showing an application of the safety auxiliary apparatus according to a fifth preferred embodiment of the present invention to a single slide door assembly.

Referring now to FIG. 10, there is shown, in a fragmentary front elevational view, the safety auxiliary apparatus according to a fifth embodiment of the present invention. While any one of the first to fourth embodiments of the present invention has been applied to the double sliding door assembly, the firth embodiment of the present invention is applied to a single sliding door assembly.

The single door assembly employed in the fifth embodiment comprises a sliding glass door 1 of a structure similar to, for example, the left glass door 1B employed in any one of the foregoing embodiments. Accordingly, the sliding glass door 1 includes the metal frame having the upright frame segment 7, the closure face 7b of which is bored to form the mounting recess 19 for fixedly accommodating the second casing 9 of the structure shown in FIG. 2.

On the other hand, an upright brace 2 having a closure face 2a cooperable with the closure face 7b of the upright frame segment 7 to define the doorway 5 has a similar mounting recess 19 defined therein by boring a corresponding portion of the closure face 2a, and the first casing 8 of the structure shown in FIG. 2 is fixedly mounted in the mounting recess 19 in the upright brace 2. The electric lines 14 extending from the light emitting and receiving elements 10 and 11 both accommodated within the first casing 8 extends upwardly through an interior of the upright brace 2 and then through the inner space 3b of the transom 3 before they are connected with the amplifier 17. Accordingly, no electric wiring is needed in the glass door 1. Even this embodiment of the present invention can bring about advantages similar to those brought about by the first embodiment of the present invention.

It is to be noted that although the first and second casings 8 and 9 have been shown and described as mounted respectively in the upright brace 2 and the upright frame segment 7, they may be reversed in position, that is, the first and second casings 8 and 9 may be mounted in the upright frame segment 7 and the upright brace 2, respectively.

Sixth Preferred Embodiment

Figure 11:
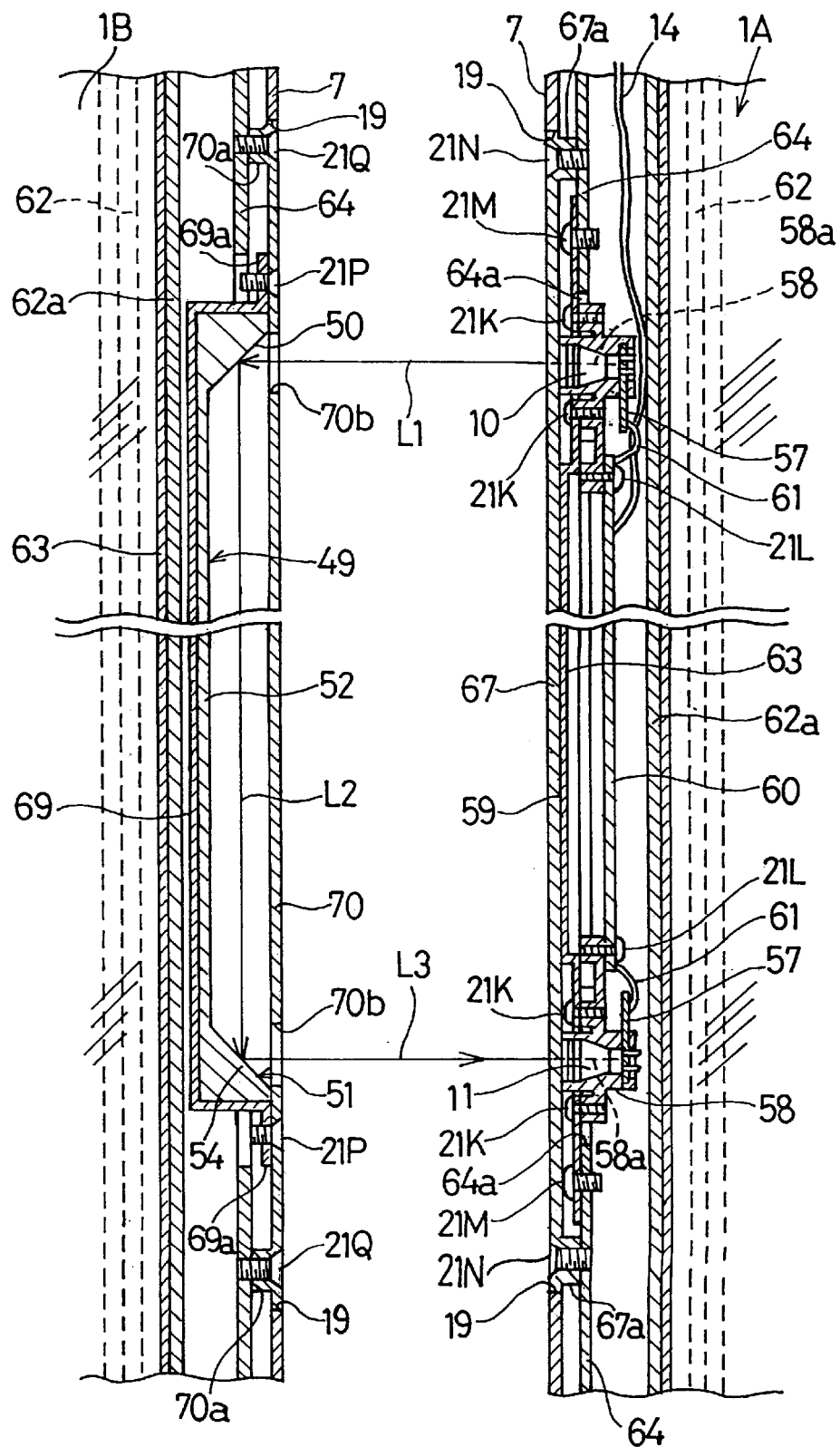
FIG. 11 is a fragmentary longitudinal sectional view, on a further enlarged scale, showing the safety auxiliary apparatus according to a sixth preferred embodiment of the present invention.
Figure 12:
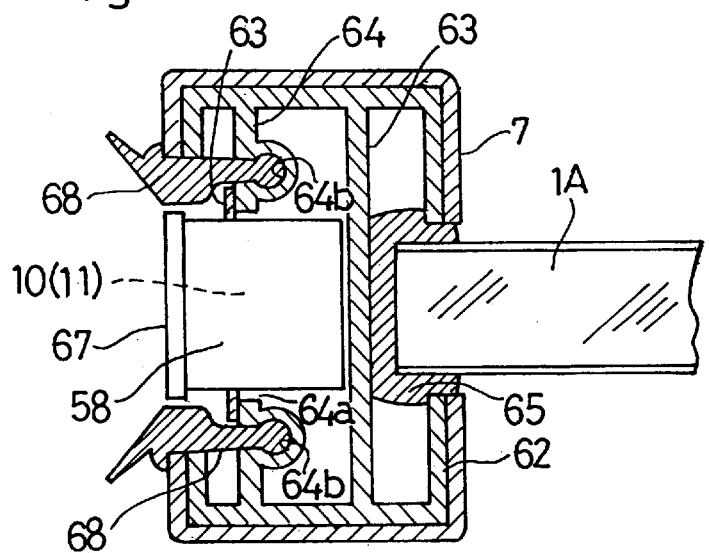
FIG. 12 is a transverse sectional view of one of frame segments, showing a component part of the safety auxiliary apparatus shown in FIG. 11.

FIG. 11 illustrates a fragmentary longitudinal sectional view of the safety auxiliary apparatus for the automatic sliding door assembly according to a sixth embodiment of the present invention, and FIG. 12 is a transverse sectional view of the upright frame segment 7 where the light emitting element 10 is positioned. In the practice of the sixth embodiment of the present invention, a unique optical reflecting element is employed so that not only can a slight misalignment in the optical system be permitted, but also the presence of an object on the track can be detected assuredly even though one or both of the right and left glass doors 1A and 1B tilts during installation thereof and/or during movement between the closed and opened positions.

Figure 13:
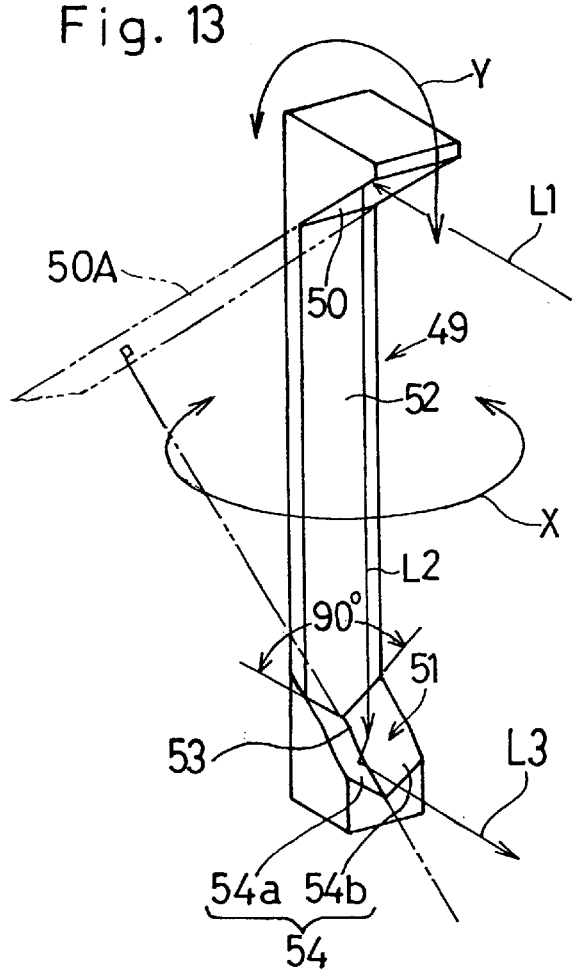
FIG. 13 is a perspective view, on an enlarged scale, of an optical reflecting element employed in the safety auxiliary apparatus shown in FIG. 11.

The optical reflecting element is identified by 49 and comprises, as best shown in FIG. 13, a generally elongated body 52 having its opposite, upper and lower ends formed unitarily with first and second beam reflecting faces 50 and 51 which are laid at right angles relative to each other. The first beam reflecting face 50 on the upper end of the elongated body 52 is a flat mirror whereas the second beam reflecting face 51 on the lower end of the elongated body 52 is employed substantially in the form of an Amici-type or Dachkanto-type (roof-shaped) mirror 54.

As shown in FIG. 13, the roof-shaped mirror 54 has first and second reflecting facets 54a and 54b that are laid at right angles relative to each other. The first and second reflecting facets 54a and 54b are joined together at a dale line 53 to render them to assume a generally V-shaped configuration, which line 53 lies perpendicular to the first reflecting face 50 or to an imaginary plane 50A extended from the first reflecting surface 50.

The optical reflecting element 49 is so designed as to operate in the following manner. Specifically, the incoming beam L1 emitted from the light emitting element 10 is reflected by the first beam reflecting face 50 so as to travel downwardly towards the second beam reflecting face 51 as indicated by L2. The reflected beam L2 subsequently impinges upon one of the first and second reflecting facets 54a and 54b and is, after having been reflected by one of the first and second reflecting facets 54a and 54b, directed diagonally downwardly so as to impinge upon the other of the first and second reflecting facets 54a and 54b. Thereafter, the beam reflected by the other of the first and second reflecting facets 54a and 54b travels towards the light receiving element 11 as indicated by L3.

The mounting of the light emitting and receiving elements 10 and 11 will now be described. As shown in FIG. 11, the light emitting and receiving elements 10 and 11 are fixedly mounted on respective carrier boards 57. Each carrier board 57 carrying the light emitting or receiving element 10 or 11 is sandwiched by a holder block 58 split into two halves along a split face 58a. The holder blocks 58 holding the carrier boards 57 together with the light emitting and receiving elements 10 and 11 are spacedly secured to a generally elongated fitting plate 59 by means of respective sets of three set screws 21K (only two set screws of each set being shown). A circuit board 60 is portioned between the holder blocks 58 and fixed in position by means of set screws 21L, with the carrier boards 57 electrically connected with the circuit board 60 by means of a wiring 61.

As shown in FIG. 12, an inner frame member 62 having first and second partition walls 63 and 64 is press-fitted, or otherwise fixedly fitted, within the interior of the upright frame segment 7 of the metal frame on each of the right and left glass doors 1A and 1B. The metal frame for each of the right and left glass doors 1A and 1B and the inner frame member 62 may be made of, for example, aluminum by the use of any known extrusion molding technique. Each glass door 1A or 1B is retained by the metal frame with one side edge thereof urged against the first partition wall 63 through a resinous cushioning material 65 bonded to the first partition wall 63.

The elongated fitting plate 59 shown in FIG. 11 is secured to the second partition wall 64 by means of a plurality of set screws 21M after the holder blocks 58 holding the light emitting and receiving elements 10 and 11, respectively, and the circuit board 60 have been accommodated within an insertion hole 64a defined in the first partition wall 63. A light transmissive decorative plate 67 for covering the front has its opposite ends integrally formed with upper and lower bosses 67a, respectively. This decorative plate 67 is fitted into the mounting recess 19 in the upright frame segment 7 with the upper and lower bosses 67a held in abutment with the second partition wall 64 and is then secured to the second partition wall 64 by means of a plurality of set screws 21N with an outer surface of said decorative plate 67 held in flush with the closure face 7b of the upright frame segment 7.

It is to be noted that the electric lines 14 connected with the circuit board 60 are drawn from the circuit board 60 so as to extend upwardly through an interior of the inner frame member 62. The second partition wall 64 is, as shown in FIG. 12, provided with parallel mounting grooves 62b for receiving sealing strips 68 made of, for example, rubber.

The optical reflecting element 49 mounted on the left glass door 1B is, as shown in FIG. 11, mounted and retained in a box 69. The box 69 has upper and lower flanges 69a protruding outwardly from opposite ends thereof and fastened to a decorative plate 70 by means of respective set screws 21P. The decorative plate 70 has its opposite ends formed with respective bosses 70a and also has two windows 70b defined therein. The decorative plate 70 with the box 69 having the optical reflecting element 49 therein being received in the mounting recess 19 is in turn secured to the upright frame segment 7 by means of respective set screws 21Q with the bosses 70a held in abutment with the second partition wall 64. In this assembled condition, the decorative plate 70 has an outer surface held in flush with the closure face 7b of the upright frame segment 7 of the metal frame on the left glass door 1B and, also the windows 70b in the decorative plate 70 are aligned with the first and second beam reflecting faces 50 and 51.

According to the safety auxiliary apparatus of the sixth embodiment of the present invention, if the mounting recesses 19 are defined in that portions of the closure faces of the upright frame segments of the metal frames on the right and left glass doors 1A and 1B, respectively, are located at the same heightwise level, the incoming and outgoing beams L1 and L3 can be set to be parallel to each other while extending in the same direction even though one of the light emitting and receiving elements 10 and 11 and the optical reflecting element 49 is displaced in position.

Figure 14A:
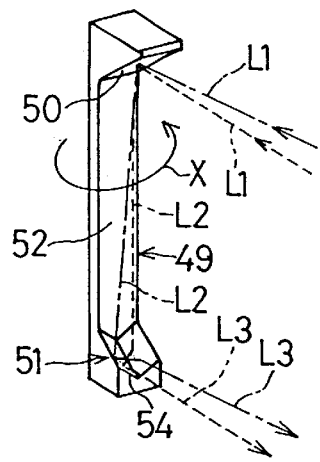
FIGS. 14A and 14B are perspective and top plan views, respectively, of the optical reflecting element shown in FIG. 13, showing the optical reflecting element is displaced in position about the longitudinal axis thereof.
Figure 14C:
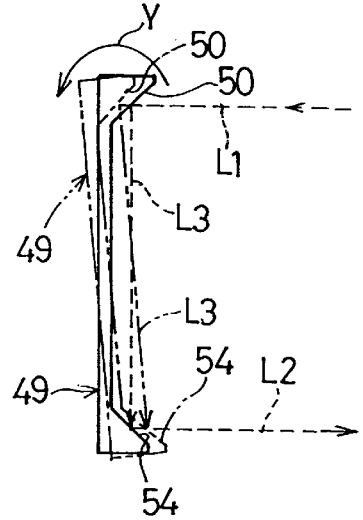
FIG. 14C is a side view of the optical reflecting element shown in FIG. 13, showing the optical reflecting element being tilted.
Figure 14B:
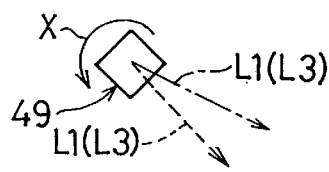

In other words, so long as the light emitting element 10 and the optical reflecting element 49 have been retained in position at the respectively required positions, the incoming beam L1 travelling from the light emitting element 10 towards the first beam reflecting face 50 and the outgoing beam L3 travelling from the second beam reflecting face 51 towards the light receiving element 11 extend parallel to each other as shown by the broken lines in FIG. 14A when viewed from a lateral direction and in the same direction as shown in FIG. 14B when viewed from top.

If, however, the optical reflecting element 49 is displaced from the required position having been rotated a slight angle in a direction shown by X about the longitudinal axis thereof, the incoming beam from the light emitting element 10 enters the optical reflecting element 49 from a direction different from that travelling when the optical reflecting element 49 is held in the required position, but the incoming beam L1 and the outgoing beam L3 remain parallel to each other when viewed from a lateral direction and extend in the same direction when viewed from top.

If as shown in FIG. 14C, the optical reflecting element 49 is displaced from the required position shown by the solid line, having been tilted in a direction shown by Y, the incoming beam L1 and the outgoing beam L3 travel in the same direction as that accomplished when the optical reflecting element 49 is held at the required position.

Since as described above the outgoing beam L3 necessarily returns to the same direction as the incoming beam L1, the light receiving element 11 can assuredly receive the outgoing beam L3 even though the optical reflecting element 49 is slightly displaced relative to any one of the light emitting and receiving elements 10 and 11 in any one of the directions X and Y. Accordingly, the presence of the object on the doorway 5 can assuredly be accomplished. For comparison purpose, a similar optical reflecting element 71 having a flat reflecting face 50 on each of the opposite ends thereof as shown in FIGS. 15A and 15B and another similar optical reflecting element 72 having a Dachkanto-type or roof-shaped mirror 51 on each of the opposite ends thereof as shown in FIGS. 15C and 15D will be discussed.

Figure 15A:
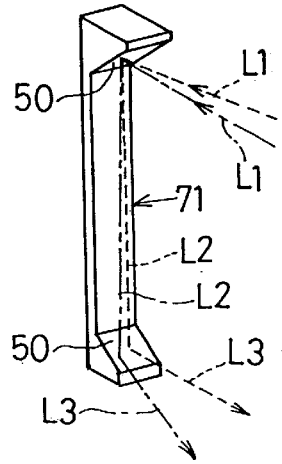
FIGS. 15A and 15B are views similar to FIGS. 14A and 14B, respectively, showing an optical reflecting element depicted for comparison purpose and having flat reflecting surfaces at respective end portions thereof.
Figure 15C:
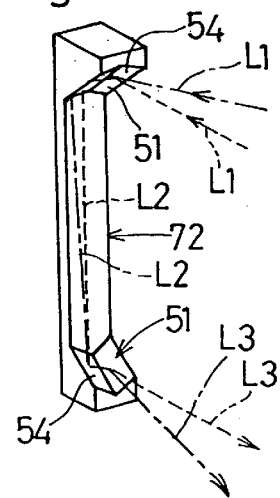
FIGS. 15C and 15D are perspective and top views, respectively, of an optical reflecting element depicted for comparison purpose and having Dacikanto-type reflecting surfaces at respective end portions thereof.
Figure 15B:
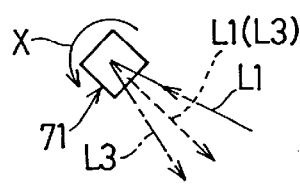

With the optical reflecting element 71 having a flat reflecting face 50 on each of the opposite ends thereof as shown in FIGS. 15A and 15B, the outgoing beam L3 will assume a parallel relation to the incoming beam L1 and travels in the same direction as the incoming beam L1 when the incoming beam L1 travels in a predetermined direction as shown by the broken line in FIG. 15B. However, if the incoming light L1 diverts in the direction X, that is, if the optical reflecting element 71 displaces in the direction X, the outgoing beam L3 will travel in a direction different from the direction of travel of the incoming light L1 when viewed from top as shown by the single-dotted line and, consequently, the light receiving element 11 will fail to receive the outgoing beam L3.

Figure 15D:
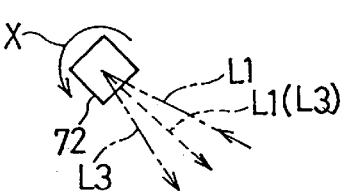

On the other hand, even with the optical reflecting element 72 having a roof-shaped mirror 51 on each of the opposite ends thereof as shown in FIGS. 15C and 15D, the outgoing beam L3 will assume a parallel relation to the incoming beam L1 and travels in the same direction as the incoming beam L1 when the incoming beam L1 travels in a predetermined direction as shown by the broken line in FIG. 15D. However, if the incoming light L1 diverts in the direction X, that is, if the optical reflecting element 71 displaces in the direction X, the outgoing beam L3 will travel in a direction different from the direction of travel of the incoming light L1 when viewed from top as shown by the single-dotted line and, consequently, the light receiving element 11 will fail to receive the outgoing beam L3.

Accordingly, only with the optical reflecting element 49 having the flat beam reflecting face 50 on one of the opposite ends thereof and also having the beam reflecting face 51 in the form of the roof-shaped mirror 54 on the other of the opposite ends thereof as best shown in FIG. 13, the outgoing beam L3 can necessarily returns in the same direction as the incoming light L1 even if the light emitting element 10 or the optical reflecting element 49 is displaced in any one of the directions X and Y.

It is to be noted in the foregoing embodiment of the present invention, the optical reflecting element 49 has been shown as a one-piece structure including the first and second beam reflecting faces 50 and 51. However, the optical reflecting element 49 may be of a structure wherein a reflecting element having a reflecting surface formed by vapor-depositing aluminum or silver is connected with each of the opposite ends of the elongated body 52. Also, while the illustrated optical reflecting element 49 is of the structure wherein the flat beam reflecting face 50 is formed on the upper end of the elongated body 52 and the beam reflecting face 51 in the form of the roof-shaped mirror is formed on the lower end of the elongated body 52, similar effects can be obtained even if the flat beam reflecting face and the roof-shaped mirror are formed on the lower and upper ends of the elongated body 52, respectively.

Seventh Preferred Embodiment

An optical reflecting element 73 which can be employed in the safety auxiliary apparatus according to a seventh preferred embodiment of the present invention is shown in FIGS. 16A to 16C which illustrate, respectively, a rear view, a left-hand side view and an enlarged cross-sectional shape taken along the line C—C in FIG. 16B. The optical reflecting element 73 shown in FIGS. 16A to 16C is of one-piece prism structure including a flat beam reflecting face 74 formed on an upper end thereof and a second reflecting face 77 formed on a lower end thereof The second reflecting face 77 is made up of a plurality of roof-shaped reflecting facets 54. This optical reflecting element 73 is secured to the upright frame segment 7 in a manner similar to that shown in FIG. 11.

The use of the optical reflecting element 73 of the structure shown in FIGS. 16A to 16C is advantageous not only in that the outgoing beam L3 can necessarily returns in the same direction as the incoming light L1 even if optical reflecting element 73 displaces relative to the light emitting elements 10 in any one of the directions X and Y, as is the case with the optical reflecting element 49 of FIG. 11, but also in that because contrary to the reflecting faces 50 and 51, the optical reflecting element 73 itself constitutes a prism, the entire amount of the incoming beam L1 can be reflected to provide the outgoing beam L3 without being attenuated.

Figure 17A:
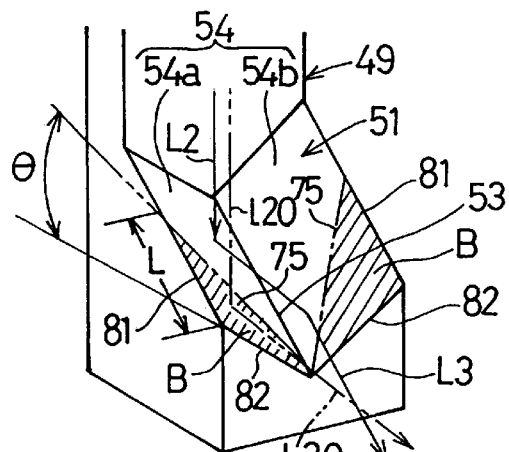
FIG. 17A is a fragmentary perspective view of a lower end portion of the optical reflecting element shown in FIG. 13.

With the optical reflecting element 49 of the type having the single roof-shaped reflecting face 54 as shown in FIG. 17A, an incident beam L20 entering triangular zones B each delimited on each of the reflecting facets 54a and 64b by a side edges 81 of the respective reflecting facet 54a or 54b, a free end edge 82 and an imaginary line 75 drawn from a free end of the dale line 53 so as to form a predetermined angle θ relative to the free end edge 82 as shown by the double-dotted line, will be reflected by only one of the reflecting facets 54a and 54b and then travel along an optical path diverting from the light receiving element 11, as shown by the double-dotted line L30, without being reflected by the other of the reflecting facets 54a and 54b. In other words, a portion of each reflecting facet 54a and 54b encompassed by the triangular zone B is an invalid surface area which cannot be used in reflecting the beam so as to travel towards the light receiving element 11.

Moreover, because the respective free end edge 82 has a relatively large length, this triangular zone B has an extremely large length L and has therefore a relatively large surface area accompanied by a relatively large loss of light. The beam L2 impinging upon the other portion of one of the reflecting facets 54a and 54b than the triangular zone B is, after having been reflected by such one of the reflecting facets 54a and 54b, reflected again by the other of the reflecting facets 54a and 54b as shown by the solid line before it travels towards the light receiving element 11.

Figure 17B:
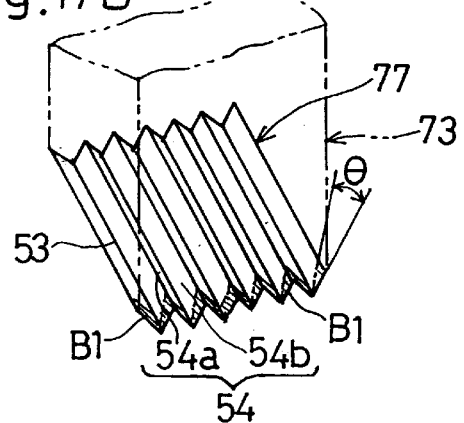
FIG. 17B is a fragmentary perspective view, on an enlarged scale, showing one of light reflecting facets formed in the lower end of the optical reflecting element shown in FIGS. 16A to 16C.

In contrast thereto, with the optical reflecting element 73 employed in the practice of the seventh embodiment of the present invention, since the second reflecting face 77 has the plurality of the roof-shaped reflecting faces 54, a total dale depth of the roof-shaped reflecting faces 54 is relatively small as compared with a dale depth of the single roof-shaped reflecting face and, accordingly, the total of surface areas of invalid triangular zones B1 shown in FIG. 17B can be reduced. Therefore, reduction in surface area of the invalid triangular zones B1 is effective to suppress the loss of light and also to reduce the size of the optical reflecting element 73.

Figure 18:
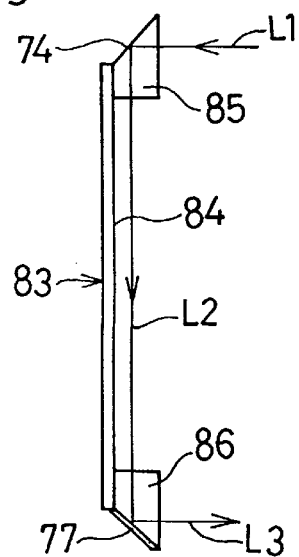
FIG. 18 is a side view showing a modified form of the optical reflecting element shown in FIGS. 16A to 16C.

It is to be noted that, as for the prism-type optical reflecting element, an optical reflecting element shown by 83 in FIG. 18 may be equally employed wherein a generally elongated support body 84 has its opposite ends to which respective prisms 85 and 86 are connected. In this case, the prism 85 secured to the upper end of the elongated body 84 has a flat reflecting face 74 formed thereon and the prism 86 secured to the lower end of the elongated body 84 has a roof-shaped reflecting face 77 formed thereon.

Eighth Preferred Embodiment

Figure 19:
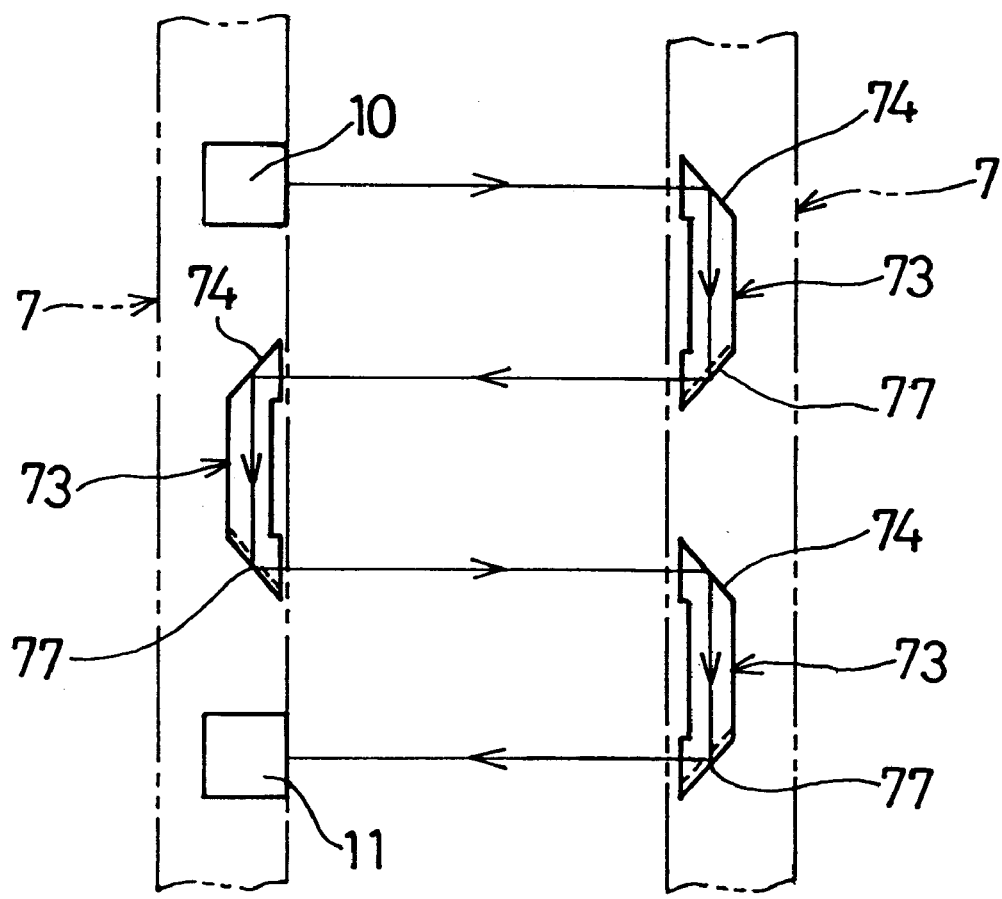
FIG. 19 is a schematic diagram showing the safety auxiliary apparatus according to an eighth preferred embodiment of the present invention.

FIG. 19 illustrates a schematic diagram showing the safety auxiliary apparatus for the automatic sliding door assembly according to an eighth embodiment of the present invention. In this embodiment, two, upper and lower optical reflecting elements 73 each identical in structure with that employed in the seventh embodiment of the present invention are employed in the upright frame segment 7 of the metal frame on the right glass door 1B. In this arrangement, the light emitting and receiving elements 10 and 11 are disposed in the upright frame segment 7 of the metal frame on the left glass door 1B so as to align with the flat reflecting face 74 at the upper end of the upper optical reflecting element 73 and with the roof-shaped reflecting face 77 at the lower end of the lower optical reflecting element 73.

In addition, an intermediate optical reflecting element 73 identical in structure with any one of the upper and lower optical reflecting element 73 is disposed in the upright frame segment 7 of the metal frame on the left glass door 1B and positioned intermediate between the light emitting and receiving elements 10 and 11 with the reflecting faces 74 and 77 of the intermediate optical reflecting element 73 aligned with the roof-shaped reflecting face 77 of the upper optical reflecting element 73 and the flat reflecting face 74 of the lower optical reflecting element 73, respectively.

According to the embodiment shown in FIG. 19, four search lines can be defined between the right and left glass doors 1A and 1B with only one light emitting element 10 and one light receiving element 11 since the beam emitted from the light emitting element 10 can travel along a generally zig-zag path before it is received by the light receiving element 11.

Although in any one of the sixth to eighth embodiments the optical reflecting element 49 or 73 has been employed in the safety auxiliary apparatus for the automatic "double" sliding door assembly, the optical reflecting element 49 or 73 can be equally employed in the safety auxiliary apparatus for an automatic "single" sliding door assembly as shown in FIG. 10. In such case, the light emitting and receiving elements 10 and 11 have to be mounted on one of the door 1 and the brace 2 and the optical reflecting element 49 or 73 has to be mounted on the other of the door 1 and the brace 2.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, in any one of the foregoing preferred embodiments of the present invention the light emitting and receiving elements or the optical reflecting element have been accommodated within the interior of the upright frame segment integral with the glass door or the interior of the upright brace. However, in the case of a single indoor sliding door for selectively opening and closing a doorway between one room to another in a house, it often observed that the upright frame segment or the upright brace is used in the form of a solid member such as, for example, a wooden bar and that a portion of the door excluding the frame is usually in the form of a double-layered structure made of wooden material, rather than a glass pane. In such case, the light emission driver shown in FIG. 4 may be disposed inside a space between the wooden plates forming the indoor sliding door and, on the other hand, the light emitting and receiving elements may be accommodated within a recess defined in the wooden bar. The electric lines leading from the light emitting and receiving elements can be drawn rearwardly from the wooden bar and be electrically connected with the light emission driver within the space between the wooden plates.

Accordingly, such changes and modifications are, unless they depart from the scope of the present invention as delivered from the claims annexed hereto, to be construed as included therein.

What is claimed is:

1. A safety auxiliary apparatus for an automatic door assembly, said apparatus comprising:

first and second doors slidable along a predetermined track for selectively opening and closing a doorway, said first and second doors having respective first and second closure faces confronting with each other;

a light emitting element for emitting a beam for detection of an object and a light receiving element for receiving the beam from the light emitting element, both of said light emitting element and said light receiving element being mounted in the first door one above the other;

an optical reflecting element mounted in the second door and including first and second reflecting surfaces positioned one above the other and confronting outwardly from the first closure face of the first door;

wherein the beam emitted by the light emitting element impinges, after having been reflected by the first reflecting surface, upon the second reflecting surface and is again reflected by the second reflecting surface so as to travel towards the light receiving element; and one of said first and second reflecting surfaces of the optical reflecting element including at least one pair of reflecting facets laid at right angles relative to each other with respect to a dale line that is substantially perpendicular to the other of said first and second reflecting surfaces.

2. The safety auxiliary apparatus as claimed in claim 1, wherein a mounting recess is defined in each of the first and second closure faces of the respective first and second doors, both of said light emitting element and said light receiving element being accommodated within the mounting recess in the first door, and said optical reflecting element being accommodated within the mounting recess in the second door.

3. The safety auxiliary apparatus as claimed in claim 2, wherein said mounting recess is defined in a closure face of a longitudinal frame member in each of the first and second doors that confronts the doorway.

4. The safety auxiliary apparatus as claimed in claim 3, wherein electric lines leading from the light emitting and receiving elements, respectively, are drawn upwardly through an interior of the longitudinal frame member.

5. The safety auxiliary apparatus as claimed in claims 1, wherein electric line leading from the light emitting and receiving elements, respectively, are drawn from the door so as to extend upwardly, and further comprising a transom for supporting an upper portion of the door, said transom including a guide rail, a hanger member fixedly mounted on the upper portion of the door and having at least one roller rotatably mounted thereon, said roller being supported on the guide rail for rolling along the guide rail, said electric lines being supported by said hanger member.

6. The safety auxiliary apparatus as claimed in claim 1, wherein each of said first and second reflecting surfaces is formed into a single prism.

7. A safety auxiliary apparatus for an automatic door assembly, said apparatus comprising:

a single door slidable along a predetermined track for selectively opening and closing a doorway, said door having a first closure face confronting the doorway;

a stationary brace having a second closure face confronting the doorway;

a light emitting element for emitting a beam for detection of an object and a light receiving element for receiving the beam from the light emitting element, both of said light emitting element and said light receiving element being mounted in one of the stationary brace and the door;

an optical reflecting element mounted in the other of the stationary brace and the door and including first and second reflecting surfaces positioned one above the other and confronting outwardly from the closure face of said one of the stationary brace and the door;

wherein the beam emitted by the light emitting element impinges, after having been reflected by the first reflecting surface, upon the second reflecting surface and is again reflected by the second reflecting surface so as to travel towards the light receiving element; and one of said first and second reflecting surfaces of the optical reflecting element including at least one pair of reflecting facets laid at right angles relative to each other with respect to a dale line that is substantially perpendicular to the other of said first and second reflecting surfaces.

8. The safety auxiliary apparatus as claimed in claim 7, wherein a mounting recess is defined in each of the door and the brace, both of said light emitting element and said light receiving element being accommodated within the mounting recess in said one of the stationary brace and the door, and said optical reflecting element being accommodated within the mounting recess in the other of the stationary brace and the door.

9. The safety auxiliary apparatus as claimed in claim 8, wherein said mounting recess is defined in a closure face of a longitudinal frame member of the door that confronts the doorway.

10. The safety auxiliary apparatus as claimed in claim 8, wherein said light emitting element and said light receiving element are accommodated in the mounting recess of the brace and electric lines leading from the light emitting and receiving elements, respectively, are drawn upwardly through an interior of the brace.

11. The safety auxiliary apparatus as claimed in claims 7, wherein electric line leading from the light emitting and receiving elements, respectively, are drawn from the door so as to extend upwardly, and further comprising a transom for supporting an upper portion of the door, said transom including a guide rail, a hanger member fixedly mounted on the upper portion of the door and having at least one roller rotatably mounted thereon, said roller being supported on the guide rail for rolling along the guide rail, said electric lines being supported by said hanger member.

12. The safety auxiliary apparatus as claimed in claim 7, wherein each of said first and second reflecting surfaces is formed into a single prism.

* * * * *